US011500913B2

(12) United States Patent
Ochiai et al.

(10) Patent No.: US 11,500,913 B2
(45) Date of Patent: Nov. 15, 2022

(54) DETERMINATION DEVICE

(71) Applicant: NTT DOCOMO, INC., Chiyoda-ku (JP)

(72) Inventors: Keiichi Ochiai, Chiyoda-ku (JP); Putri Fatina, Chiyoda-ku (JP); Yusuke Fukazawa, Chiyoda-ku (JP)

(73) Assignee: NTT DOCOMO, INC., Chiyoda-ku (JP)

(*) Notice: Subject to any disclaimer, the term of this patent is extended or adjusted under 35 U.S.C. 154(b) by 0 days.

(21) Appl. No.: 17/041,914

(22) PCT Filed: Dec. 5, 2018

(86) PCT No.: PCT/JP2018/044712
§ 371 (c)(1),
(2) Date: Sep. 25, 2020

(87) PCT Pub. No.: WO2019/187357
PCT Pub. Date: Oct. 3, 2019

(65) Prior Publication Data
US 2021/0011938 A1 Jan. 14, 2021

(30) Foreign Application Priority Data

Mar. 29, 2018 (JP) .............................. JP2018-064562

(51) Int. Cl.
*G06F 16/00* (2019.01)
*G06F 16/35* (2019.01)
(Continued)

(52) U.S. Cl.
CPC ............ *G06F 16/35* (2019.01); *G06F 16/335* (2019.01); *G06F 16/387* (2019.01);
(Continued)

(58) Field of Classification Search
CPC .. G06F 16/2458; G06F 16/335; G06F 16/337; G06F 16/35; G06F 16/387; G06F 2207/025

See application file for complete search history.

(56) References Cited

U.S. PATENT DOCUMENTS

2010/0111372 A1* 5/2010 Zheng ................ G06Q 30/0205
382/113
2011/0081634 A1* 4/2011 Kurata ..................... G06N 5/02
434/236

(Continued)

FOREIGN PATENT DOCUMENTS

CN 106651535 A 5/2017
JP 2010-128806 A 6/2010
(Continued)

OTHER PUBLICATIONS

International Search Report dated Mar. 12, 2019 in PCT/JP2018/044712 filed on Dec. 5, 2018, 2 pages.
(Continued)

*Primary Examiner* — Diedra McQuitery
(74) *Attorney, Agent, or Firm* — Oblon, McClelland, Maier & Neustadt, L.L.P.

(57) ABSTRACT

A determination device 1 includes: a history storage unit 101 configured to accumulate and store use history information in which application identification information, position information indicating a position of a user, and user identification information are correlated with each other; a use region UU number totaling unit 105 configured to total a UU number for each of a plurality of regions on the basis of the use history information for a specific application; a use region number totaling unit 106 configured to total the number of regions on the basis of the use history information for the specific application; a score calculating unit 107 configured to calculate a regionality score for each of the plurality of regions on the basis of the UU number and the number of regions for the specific application; and a determination unit 108 configured to determine whether there is regionality for the specific application on the basis of the regionality score.

5 Claims, 12 Drawing Sheets

(51) Int. Cl.
  *G06F 16/387*   (2019.01)
  *G06F 16/335*   (2019.01)
  *G06F 16/2458*  (2019.01)
(52) U.S. Cl.
  CPC ........ *G06F 16/2458* (2019.01); *G06F 16/337* (2019.01); *G06F 2207/025* (2013.01)

(56) References Cited

U.S. PATENT DOCUMENTS

2015/0073709 A1\* 3/2015 Huang .................. H04W 4/024
   701/537
2017/0220966 A1\* 8/2017 Wang ..................... G06Q 50/30

FOREIGN PATENT DOCUMENTS

| JP | 2013-228820 A | 11/2013 | |
|----|---------------|---------|---|
| JP | 2014-182572 A | 9/2014 | |
| JP | 2016-192097 A | 11/2016 | |
| JP | 2017-097499 A | 6/2017 | |
| JP | 2017-188006 A | 10/2017 | |
| WO | WO-2015190289 A1 \* | 12/2015 | ............. G06N 20/00 |

OTHER PUBLICATIONS

International Preliminary Report on Patentability and Written Opinion dated Oct. 8, 2020 in PCT/JP2018/044712 (submitting English translation only) 10 pages.

\* cited by examiner

Fig.2

| TERMINAL IDENTIFIER | START TIME | LONGITUDE | LATITUDE | PACKAGE NAME |
|---|---|---|---|---|
| U1 | 2017/12/01 10:00 | 140.0 | 35.0 | P1 |
| U1 | 2017/12/01 12:00 | 140.0 | 35.0 | P1 |
| U1 | 2017/12/01 14:00 | 140.0 | 35.1 | P2 |
| U2 | 2017/12/01 10:00 | 140.5 | 35.5 | PX |
| ⋮ | ⋮ | ⋮ | ⋮ | ⋮ |

Fig.3

| TERMINAL IDENTIFIER | RESIDENCE NAME |
|---|---|
| U1 | TOKYO |
| U2 | TOKYO |
| U3 | KANAGAWA |
| UX | OKINAWA |
| ⋮ | ⋮ |

Fig.4

| PACKAGE NAME | REGIONALITY |
|---|---|
| P1 | YES |
| P2 | NO |
| PX | YES |
| ⋮ | ⋮ |

DETERMINATION DEVICE

TECHNICAL FIELD

An aspect of the present invention relates to a determination device that determines the type of application provided to a user.

BACKGROUND ART

In the related art, techniques of classifying applications which are to be provided to a user who uses a terminal are known. Patent Literature 1 discloses a technique of calculating a use state of an application for each region on the basis of use position information indicating a position where the application is used, classifying applications on the basis of the result of calculation, and recommending an application to a user on the basis of the result of classification.

CITATION LIST

Patent Literature

[Patent Literature 1] Japanese Unexamined Patent Publication No. 2017-188006

SUMMARY OF INVENTION

Technical Problem

In the technique described in Patent Literature 1, when it is determined that a user is located in a nonroutine area, an application classified as an application of a nonroutine area is set as a candidate to be recommended. In Patent Literature 1, only classification into routine/nonroutine areas is performed. Accordingly, it is not easy to estimate an application in which a user is actually interested for each region to the user.

Therefore, an aspect of the invention is invented in consideration of the above-mentioned circumstances and an objective thereof is to provide a determination device that can appropriately classify an application in consideration of regionality in a use tendency of the application.

Solution to Problem

In order to achieve the above-mentioned objective, a determination device according to an aspect of the invention is a determination device configured to determine the type of application which is to be provided to a user, the determination device including: a history storage unit configured to accumulate and store use history information in which application identification information for identifying an application used by a user, position information indicating a position of the user when the application is used, and user identification information for identifying the user are correlated with each other whenever a plurality of applications are used by a plurality of users; a first totaling unit configured to total a numerical value indicating a use tendency of a specific application in each of a plurality of regions using the use history information in which a position indicated by the position information is included in the region on the basis of the use history information for the specific application stored in the history storage unit; a second totaling unit configured to total the number of regions including the position indicated by the position information among the plurality of regions using the use history information for the specific application stored in the history storage unit; a score calculating unit configured to calculate a score for each of the plurality of regions on the basis of the numerical value indicating the use tendency and the number of regions for the specific application; and a determination unit configured to determine whether there is regionality for the specific application on the basis of the score.

According to the aspect, the numerical value indicating a use tendency of a specific application in each of a plurality of regions is totaled using the use history information on use of applications by users, and the number of regions including a position at which the specific application is used is totaled. A score for each of the plurality of regions is calculated on the basis of the numerical value indicating the use tendency and the number of regions, and whether there is regionality for the specific application is determined on the basis of the calculated score. By determining regionality in this way, it is possible to appropriately classify an application in consideration of regionality. As a result, it is possible to identify an application in which a user is actually interested for each region.

Advantageous Effects of Invention

According to an aspect of the invention, it is possible to appropriately classify an application in consideration of regionality in a use tendency of the application.

BRIEF DESCRIPTION OF DRAWINGS

FIG. 2 is a diagram illustrating an example of a data structure of use history information which is stored in a history storage unit 101 illustrated in FIG. 1.

FIG. 3 is a diagram illustrating an example of a data structure of residential region information which is stored in a residence storage unit 103 illustrated in FIG. 1.

FIG. 4 is a diagram illustrating an example of a data structure of determination result information which is stored in a determination result storage unit 109 by a determination unit 108 illustrated in FIG. 1.

DESCRIPTION OF EMBODIMENTS

Hereinafter, an embodiment of the invention will be described with reference to the accompanying drawings. As long as possible, the same elements will be referred to by the same reference signs and description thereof will not be repeated.

Figure 1:
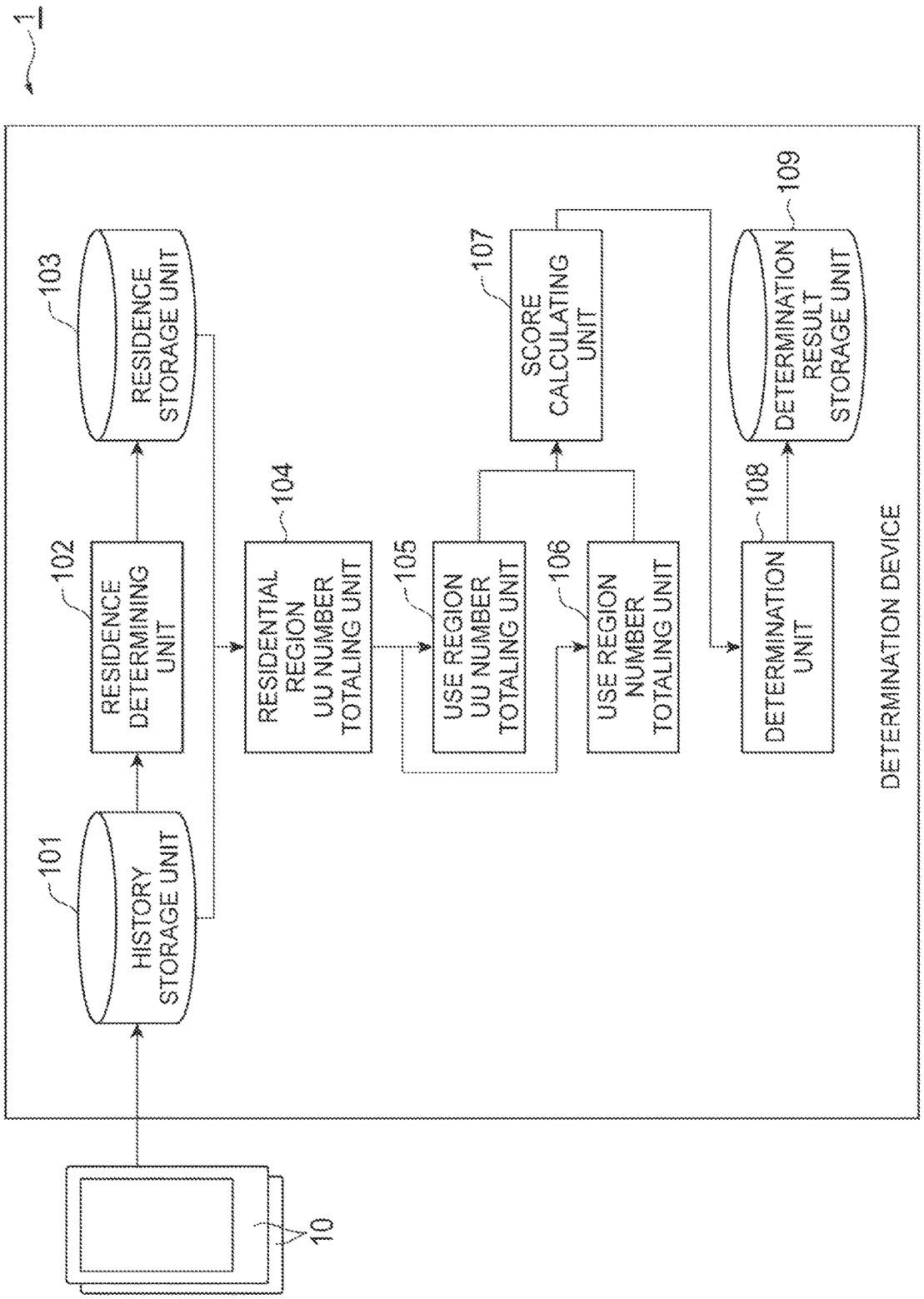
FIG. 1 is a block diagram illustrating a configuration of a determination device 1 according to an exemplary embodiment of the invention.

FIG. 1 is a block diagram illustrating a configuration of a determination device 1 according to an exemplary embodiment of the invention. The determination device 1 is a server device that determines the type of application (also referred to as an application program or software) which is to be provided to mobile communication terminals 10 such as smartphones, tablet terminals, and feature phones which are used by a plurality of users via a communication network and that provides recommendation information for the application on the basis of the determined type. The plurality of mobile communication terminals 10 can perform communication with the determination device 1 by communicative connection thereto via a communication network such as a mobile communication network.

Various information providing services can be suitably utilized using a mobile communication terminal 10 by downloading an application which is an object of recommendation information which is to be provided by the determination device 1 onto the mobile communication terminal 10 and starting the downloaded application. Examples of such an application include applications receiving information associated with regions such as tourism information, traffic information, campaign information, shop information, and site information of specific categories (such as golf courses and fishing places) and applications capable of receiving broadcasts such as FM broadcasts and digital television broadcasts.

As illustrated in FIG. 1, the determination device 1 includes a history storage unit 101, a residence determining unit 102, a residence storage unit 103, a residential region UU number totaling unit (a third totaling unit) 104, a use region UU number totaling unit (a first totaling unit) 105, a use region number totaling unit (a second totaling unit) 106, a score calculating unit 107, a determination unit 108, and a determination result storage unit 109. Elements of the determination device 1 will be described below.

The history storage unit 101 stores, in advance, use history information on use histories of an application used by users of a plurality of mobile communication terminals 10. The use history information is generated and stored on the basis of start logs of the application stored in the plurality of mobile communication terminals 10. For example, by causing the determination device 1 to collect start logs of the plurality of mobile communication terminals 10 at arbitrary times (such as periodic times), use history information is stored in the history storage unit 101.

FIG. 2 illustrates an example of a data structure of use history information stored in the history storage unit 101. As illustrated in the drawing, a plurality of pieces of use history information on the start of applications at a plurality of times by a plurality of users are accumulated and stored in the history storage unit 101. In each piece of use history information, a terminal identifier (for example, "U1") which is user identification information for identifying a user, a package name (for example, "P1") which is application identification information for identifying an application used by the user, an application start time (for example, "2017/ 12/01 10:00"), and longitude and latitude (for example, "140.0", "35.0") which is position information indicating a position of the user at the application start time are correlated. Here, information at the time of starting an application is stored, but other types of information (for example, information at the time of ending the use of an application and information at the time of transmitting and receiving information) may be stored as long as it is information at the time of use of the application.

Referring back to FIG. 1, the residence determining unit 102 reads use history information of each user by extracting the use history information from use history information stored in the history storage unit 101 on the basis of a terminal identifier, and converts a position indicated by longitude and latitude included in the use history information of each user into a predetermined region (for example, an area of a prefecture). Then, the residence determining unit 102 totals the number of use times of an application by a user who is located in each region by totaling a frequency of the use history information for each region to which the use history information of each user is converted, and estimates a region with the largest number of use times as a region indicating a residence of the user (a residential region). This estimation is based on the assumption that an application is most often used by a user in the vicinity of a residence thereof. The residence determining unit 102 stores information of the estimated residential region (residence information) of each user in the residence storage unit 103.

FIG. 3 illustrates an example of a data structure of information of residential regions stored in the residence storage unit 103. As illustrated in the drawing, the residence storage unit 103 stores a residence name (for example, "Tokyo") indicating a residential region in correlation with each terminal identifier for identifying a user (for example, "U1").

Referring back to FIG. 1, the residential region UU number totaling unit 104 totals the number of unique users (also referred to as a UU number) for each residential region associated with use of each application on the basis of the use history information stored in the history storage unit 101. Specifically, the residential region UU number totaling unit 104 extracts use history information in which a package name corresponds to an application and a residence indicated by a residence name of a user who is identified by a terminal identifier is included in a residential region for each of a plurality of applications and for each of a plurality of residential regions on the basis of information of residential regions stored in the residence storage unit 103 and use history information stored in the history storage unit 101. Then, the residential region UU number totaling unit 104 calculates a UU number on the basis of the use history information extracted for each of the plurality of applications and for each of the plurality of residential regions. The UU number indicates the number of users of each residential region who use the corresponding application. The residential region UU number totaling unit 104 compares the UU number with a predetermined threshold value and excludes an application corresponding to the UU number from following objects to be totaled when the UU number is less than the threshold value. Accordingly, an application with a small number of users can be excluded from recommended objects. Then, the residential region UU number totaling unit 104 outputs information (for example, package names) for identifying applications which are not excluded from the objects to be totaled to the use region UU number totaling unit 105 and the use region number totaling unit 106.

Here, the residential region UU number totaling unit 104 may determine, in advance, a threshold value for comparison with the UU number as a common threshold value in the residential regions or may determine, in advance, the threshold value as threshold values which are different depending on the residential regions. In this case, the threshold values may be calculated and set in advance such that the sum of all the threshold values is N (where N is a predetermined natural number) on the basis of data of a population proportion in each residential region. By employing this configuration, an application with a small number of users can be excluded from the objects to be totaled in consideration of the population of each residential region. The residential region UU number totaling unit 104 can exclude the application from the objects to be totaled when the UU number in at least one residential region is less than the threshold value, may exclude the application from the objects to be totaled when the UU number in residential regions corresponding to a predetermined number of regions is less than the threshold value, or may exclude the application from the objects to be totaled when the UU number in all the residential regions is less than the threshold value.

The use region UU number totaling unit 105 totals the UU number for each region including positions of users at the time of use of each application which has not been excluded from the objects to be totaled (hereinafter also referred to as a use region) on the basis of the use history information stored in the history storage unit 101 in which a start time is included in a predetermined period. Specifically, the use region UU number totaling unit 105 extracts use history information in which a package name corresponds to the application and a position indicated by the longitude and latitude included in the use history information is included in a corresponding use region (for example, an area partitioned into a grid) for each of a plurality of applications and for each of a plurality of use regions on the basis of the use history information stored in the history storage unit 101. Then, the use region UU number totaling unit 105 calculates the UU number which is a numerical value indicating a use tendency of an application for each application and for each use region on the basis of the use history information extracted for each of the plurality of applications and for each of the plurality of use regions. The UU number indicates the number of users who are located in each use region and who use the corresponding application and indicates the use tendency of the application in each use region. The use region UU number totaling unit 105 outputs the totaled UU number to the score calculating unit 107. For example, the use region UU number totaling unit 105 outputs the UU number, "1,986 users," corresponding to an application identified by a package name "P1" and a use region, "area A."

The use region number totaling unit 106 totals the number of use regions in which positions of users at the time of use of each application which has not been excluded from the objects to be totaled are included on the basis of the use history information stored in the history storage unit 101 in which the start time is included in a predetermined period. The number of use regions is totaled in preset use regions such that it is the same in the units of totaling the UU number in the use region UU number totaling unit 105. Specifically, the use region number totaling unit 106 extracts the use history information in which a package name corresponds to a corresponding application for each of the plurality of applications on the basis of use history information stored in the history storage unit 101. The use region number totaling unit 106 calculates the number of use regions in which a position indicated by the longitude and latitude included in the use history information is included for each application on the basis of the use history information extracted for each of the plurality of applications. The number of use regions indicates in what use regions each application is used. The use region number totaling unit 106 outputs the totaled number of use regions to the score calculating unit 107. For example, the use region number totaling unit 106 outputs the number of use regions "137 regions" of an application which is identified by a package name "P1."

Various regions can be set as the use regions which are preset for totaling in the use region UU number totaling unit 105 and the use region number totaling unit 106, and for example, regions which are partitioned into a grid shape, regions which are partitioned as municipalities, and regions which are preset in a communication network may be used.

The score calculating unit 107 calculates a regionality score SC which serves as a measure for determination of regionality of an application on the basis of the UU number TF for each use region associated with a specific application and totaled by the use region UU number totaling unit 105 and the number of use regions DF associated with the specific application and totaled by the use region number totaling unit 106. The regionality score SC is calculated for each use region with respect to the specific application. For example, the score calculating unit 107 may calculate a numerical value obtained by dividing the UU number TF by the number of use regions DF as the regionality score SC using Expression (1) or may calculate a numerical value obtained by dividing a logarithmically converted UU number TF by a logarithmically converted number of use regions DF as the regionality score SC using Expression (2).

$$SC = TF \times (1/DF) \quad (1)$$

$$SC = \log(TF) \times \{1/\log(DF)\} \quad (2);$$

The score calculating unit 107 outputs the calculated regionality score SC for each application and for each use region to the determination unit 108.

The determination unit 108 determines whether there is regionality for the specific application on the basis of the regionality score SC for each use region calculated by the score calculating unit 107. That is, the determination unit 108 determines that there "is" regionality for the specific application when at least one of the regionality scores SC for the use regions is equal to or greater than a predetermined value. In this case, the determination unit 108 determines that there "is" regionality when the regionality scores SC for a predetermined number or larger number of use regions are equal to or greater than the predetermined value and determines that there is "no regionality" otherwise. Then, the determination unit 108 stores the determination results of regionality for a plurality of applications in the determination result storage unit 109. On the other hand, the determination unit 108 may determine whether there is regionality on the basis of the regionality scores SC for each of a plurality of applications and for each of a plurality of use regions and store the determination result of regionality for each of the plurality of applications and for each of the plurality of use regions in the determination result storage unit 109.

FIG. 4 illustrates an example of a data structure of determination results which are stored in the determination result storage unit 109 by the determination unit 108. As illustrated in the drawing, the determination result storage unit 109 stores regionality information "YES," "NO," and "YES" in correlation with the plurality of applications which are identified by package names "P1," "P2," and "PX." Data on the determination results which are stored in this way can be referred to by a mobile communication terminal 10 or the like via a communication network. The determination result data may be actively transmitted from the determination device 1 to the outside, for example, to the mobile communication terminal 10, via the communication network, or the determination result data may be processed into recommendation information for the application and transmitted.

Figure 5:
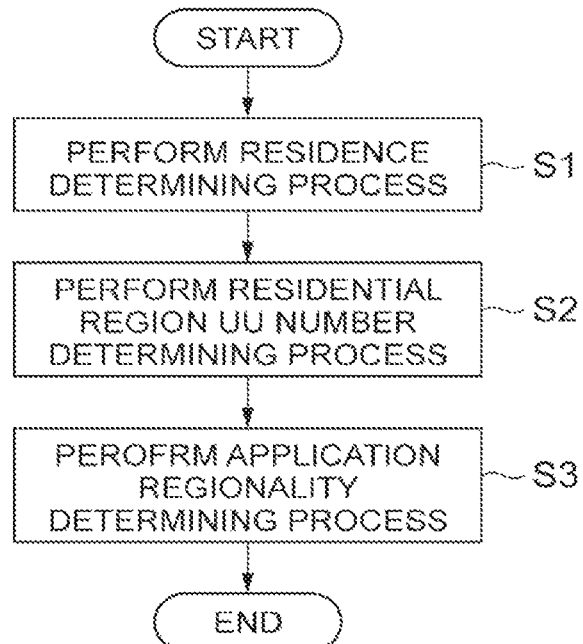
FIG. 5 is a flowchart illustrating an operation flow of a determination process which is performed by the determination device 1 illustrated in FIG. 1.
Figure 6:
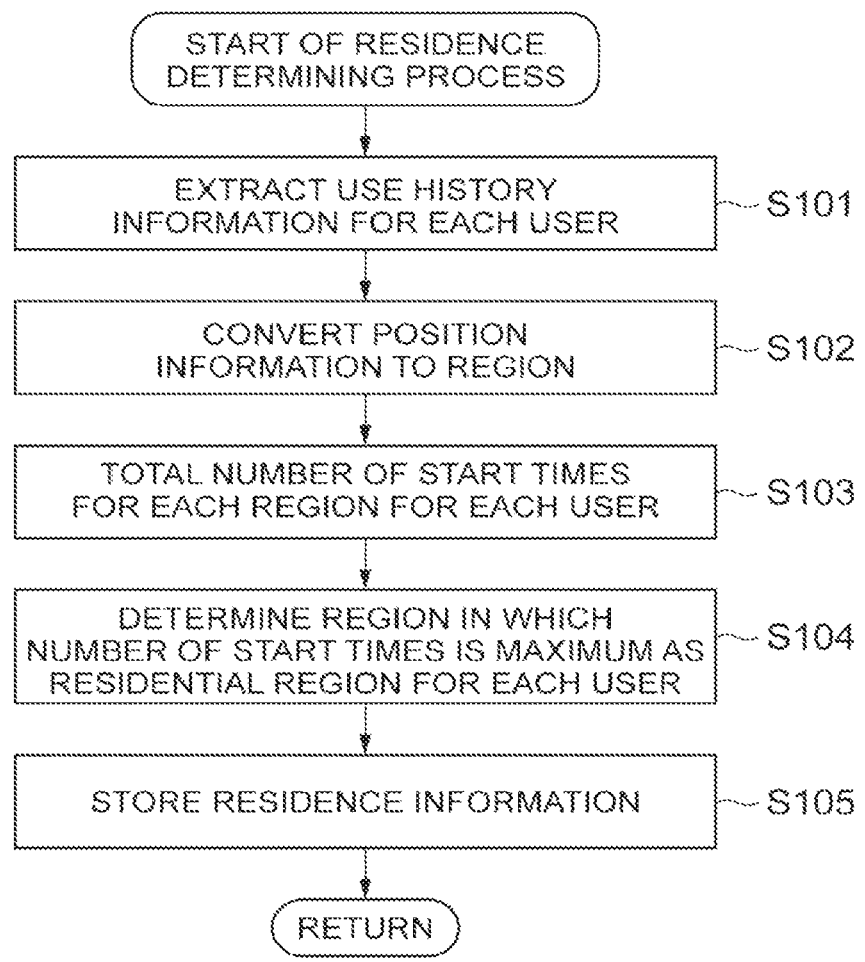
FIG. 6 is a flowchart illustrating a detailed operation flow of a residence determining process illustrated in FIG. 5.
Figure 7:
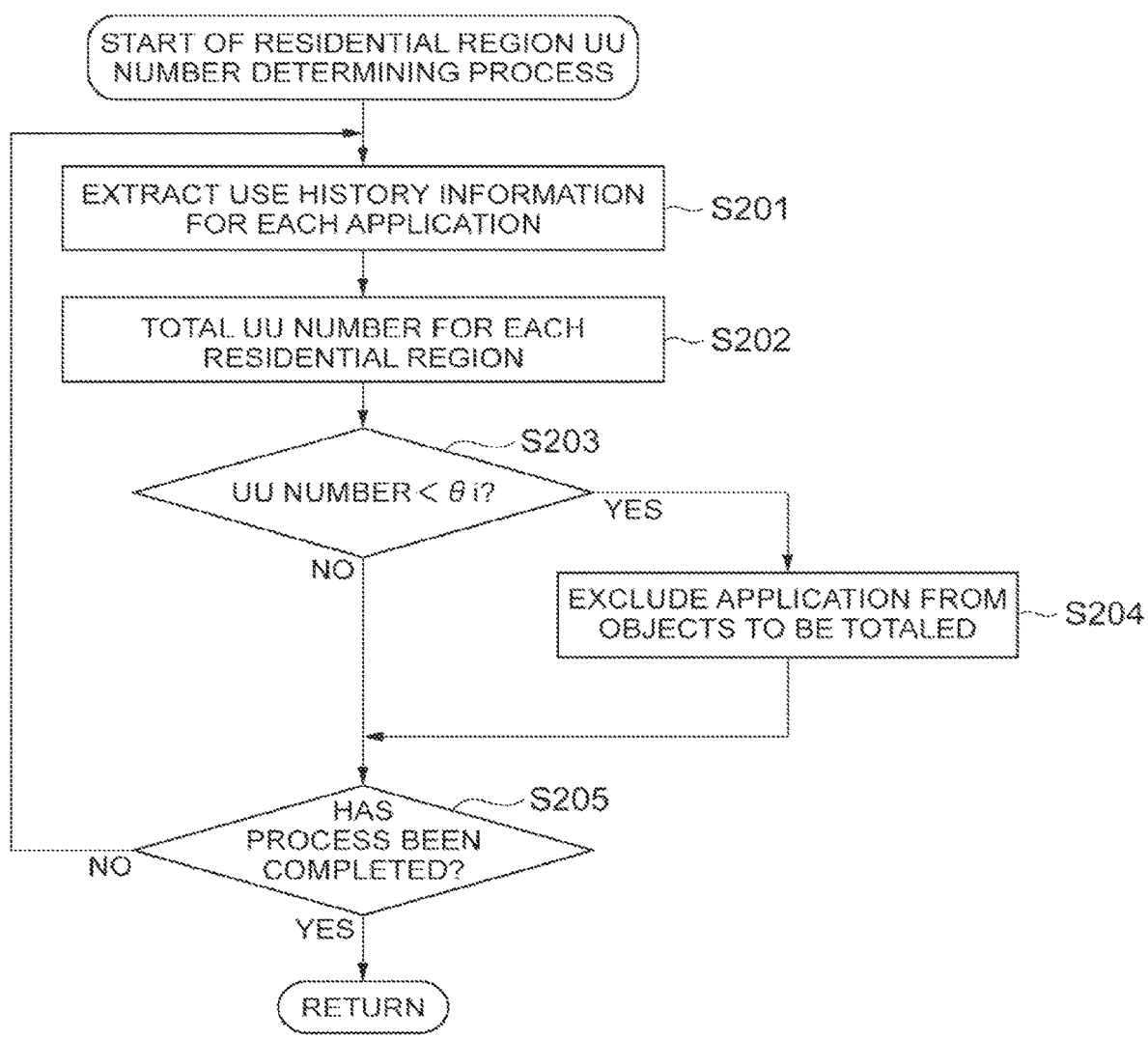
FIG. 7 is a flowchart illustrating a detailed operation flow of a residential region UU number determining process illustrated in FIG. 5.
Figure 8:
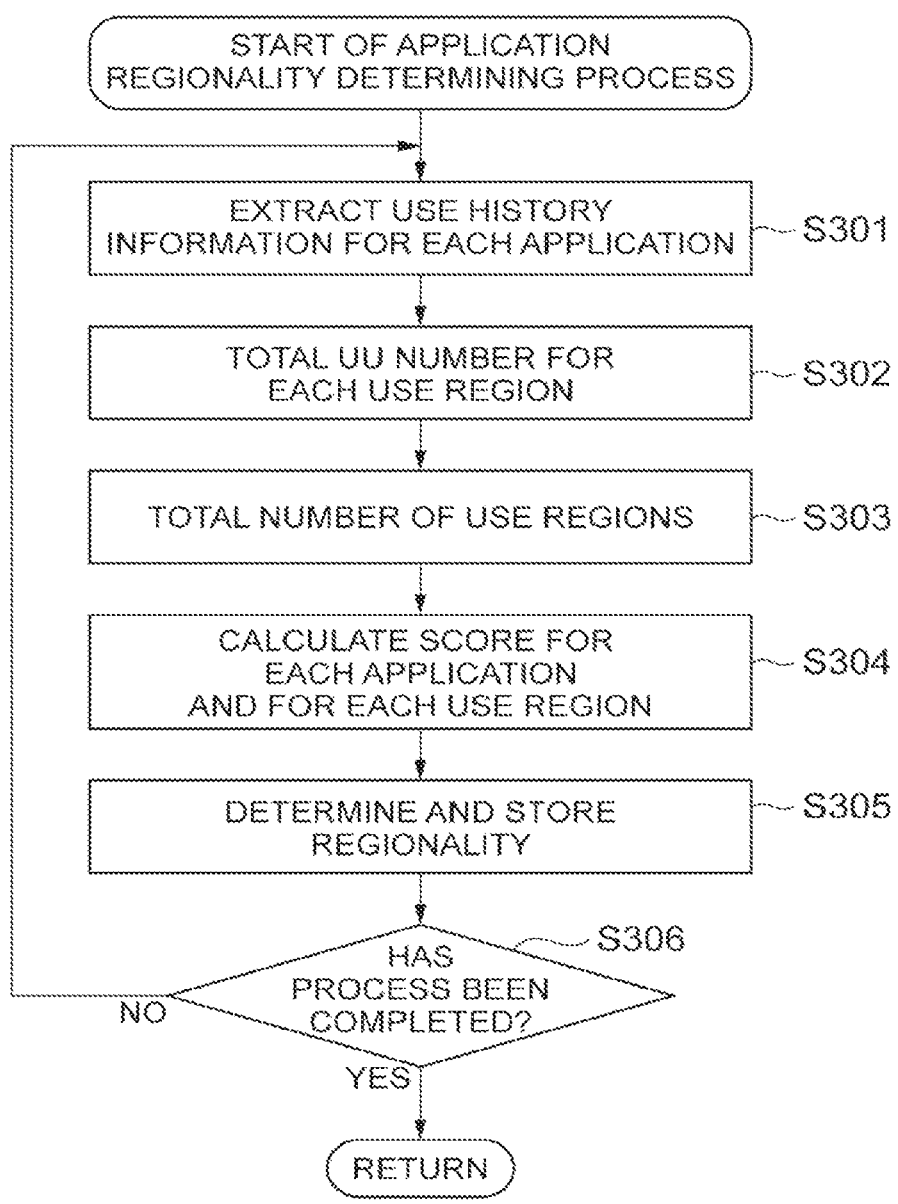
FIG. 8 is a flowchart illustrating a detailed operation flow of an application regionality determining process illustrated in FIG. 5.

A determination process of the determination device 1 having the above-mentioned configuration will be described below. FIG. 5 is a flowchart illustrating an operation flow of a determination process which is performed by the determination device 1. FIG. 6 is a flowchart illustrating a detailed operation flow of a residence determining process illustrated in FIG. 5. FIG. 7 is a flowchart illustrating a detailed operation flow of a residential region UU number determining process illustrated in FIG. 5. FIG. 8 is a flowchart illustrating a detailed operation flow of an application regionality determining process illustrated in FIG. 5.

The determination process for an application which is performed by the determination device 1 and which is illustrated in FIG. 5 is automatically started at arbitrary times (at periodic times or at regular times). When the determination process is started, a residence determining process (Step S1) of determining a residential region of each user, a residential region UU number determining process (Step S2) of determining the UU number of each residential region associated with use of each application, and an application regionality determining process (Step S3) of determining whether there is regionality for each application are performed in this order.

The residence determining process (Step S1) is performed in the order illustrated in FIG. 6. First, the residence determining unit 102 extracts and reads the use history information of each user from the history storage unit 101 (Step S101). Thereafter, the residence determining unit 102 converts position information of a user included in the use history information to a predetermined region (Step S102). Then, the residence determining unit 102 totals the number of start times (the number of use times) in each region for each user (Step S103). As a result, the residence determining unit 102 determines that a region with the maximum number of start times is a residential region for each user (Step S104). The residence determining unit 102 stores residence information of each user in the residence storage unit 103 (Step S105).

The residential region UU number determining process (Step S2) is performed in the order illustrated in FIG. 7. First, the residential region UU number totaling unit 104 extracts and reads the use history information associated with users for each residential region corresponding to the specific application from the history storage unit 101 (Step S201). Then, the residential region UU number totaling unit 104 totals the UU number for each of a plurality of residential regions for the specific application (Step S202). Thereafter, the residential region UU number totaling unit 104 compares the totaled UU number with a threshold value θi (where i=1, 2, 3, . . . ) which is preset for each residential region (Step S203). When the UU number corresponding to at least one residential region is less than the threshold value θi as the result of comparison (Step S203: YES), the residential region UU number totaling unit 104 excludes the corresponding application from the subsequent objects to be totaled (Step S204). On the other hand, when there is no residential region in which the UU number is less than the threshold value θi (Step S203: NO), the residential region UU number totaling unit 104 does not exclude the corresponding application from the subsequent objects to be totaled.

The UU number determining processes (Steps S201 to S204) are repeatedly performed on all the applications until it is determined that the determination has been performed on all the applications by the residential region UU number totaling unit 104 (Step S205).

The application regionality determining process (Step S3) is performed in the order illustrated in FIG. 8. First, the use region UU number totaling unit 105 extracts and reads the use history information for each of a plurality of use regions corresponding to the specific application from the history storage unit 101 (Step S301). Then, the use region UU number totaling unit 105 totals the UU number for each of the plurality of use regions on the basis of the read use history information (Step S302). The use region number totaling unit 106 totals the number of use regions to which positions indicated by position information included in the read use history information belong after extracting and reading the use history information corresponding to the specific application from the history storage unit 101 (Step S303).

Thereafter, the score calculating unit 107 calculates the regionality score SC using Expression (1) or Expression (2) on the basis of the totaled UU number TF for each use region and the totaled number of use regions DF for the specific application (Step S304). Then, the determination unit 108 generates a determination result of regionality by determining whether there is regionality on the basis of the regionality score SC for the specific application, and stores the determination result of regionality in the determination result storage unit 109 (Step S305).

The regionality determining processes (Steps S301 to S305) are repeatedly performed on all the applications until it is determined that the determination has been performed on all the applications by the determination device 1 (Step S306).

Operations and advantages of the determination device 1 according to this embodiment will be described below. In the determination device 1, on the basis of the use history information associated with use of applications by users of mobile communication terminals 10, the UU number for users who have used a specific application in each of a plurality of use regions is totaled and the number of use regions in which positions where the specific application has been used are included is totaled. Then, the regionality score SC for each of the plurality of use regions is calculated on the basis of the UU number and the number of use regions, and whether there is regionality for the specific application is determined on the basis of the regionality score SC. By determining the regionality in this way, it is possible to appropriately classify applications in consideration of regionality of a use tendency. As a result, it is possible to identify an application in which a user is actually interested for each region.

In the above embodiment, a specific application for which at least one of the UU numbers in residential regions associated with use of the specific application is less than a threshold value is excluded from objects for determination of regionality. When the regionality score for an application with a small number of users is calculated using the UU number and the number of use regions, it may be erroneously determined that regionality is high. As in the above embodiment, by excluding an application with a small number of users in residential regions from the objects for determination of regionality, it is possible to prevent regionality from being erroneously classified to be high. By separately setting the threshold values for residential regions of users and determining whether to exclude an application, it is possible to appropriately determine applications as objects to be determined according to the population of each residential region.

The block diagrams which are used above for description of the embodiments illustrate blocks of functional units. Such functional blocks (constituent units) are realized in an arbitrary combination of hardware and/or software. A means for realizing each functional block is not particularly limited. That is, each functional block may be realized by a single device which is physically and/or logically combined or may be realized by two or more devices which are physically and/or logically separated and which are directly and/or indirectly linked to each other (for example, in a wired and/or wireless manner).

Figure 9:
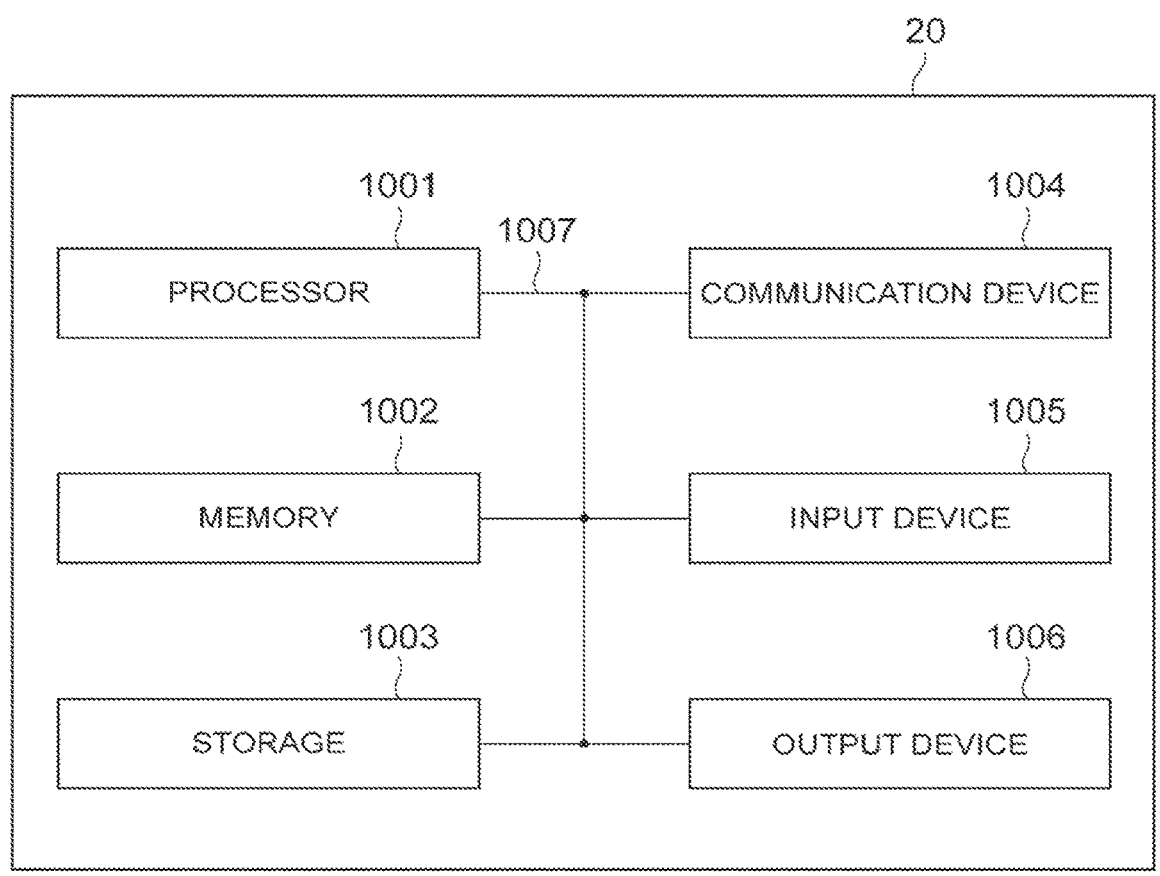
FIG. 9 is a diagram illustrating an example of a hardware configuration of a computer 20 constituting the determination device 1 illustrated in FIG. 1.

For example, a device constituting the determination device 1 according to an embodiment of the invention may serve as a computer that performs the processes of the determination device 1 according to this embodiment. FIG. 9 is a diagram illustrating an example of a hardware configuration of a computer 20 constituting the determination device 1 according to this embodiment. The computer 20 may physically include a processor 1001, a memory 1002, a storage 1003, a communication device 1004, an input device 1005, an output device 1006, and a bus 1007.

In the description of this embodiment, the term "device" can be replaced with circuit, device, unit, or the like. The hardware configuration of the computer 20 may be configured to include one or more devices illustrated in the drawing or may be configured to exclude some devices thereof.

The functions of the computer 20 can be realized by reading predetermined software (program) onto the hardware such as the processor 1001 and the memory 1002 and causing the processor 1001 to perform arithmetic operations and to control communication using the communication device 1004 and reading and/or writing of data from/to the memory 1002 and the storage 1003.

The processor 1001 controls the computer as a whole, for example, by causing an operating system to operate. The processor 1001 may be configured as a central processing unit (CPU) including an interface with peripherals, a controller, an arithmetic device, and a register. For example, the residence determining unit 102, the residential region UU number totaling unit 104, the use region UU number totaling unit 105, the use region number totaling unit 106, the score calculating unit 107, and the determination unit 108 may be realized by the processor 1001.

The processor 1001 reads a program (program code), a software module, or data from the storage 1003 and/or the communication device 1004 into the memory 1002 and performs various processes in accordance therewith. As the program, a program that causes a computer to perform at least some of the operations described in the above embodiment is used. For example, the residence determining unit 102 of the computer 20 may be realized by a control program which is stored in the memory 1002 and which runs on the processor 1001, and the other functional blocks may be realized in the same way. The various processes described above are described as being performed by a single processor 1001, but they may be simultaneously or sequentially performed by two or more processors 1001. The processor 1001 may be implemented as one or more chips. The program may be transmitted from a network via an electrical telecommunication line.

The memory 1002 is a computer-readable recording medium and may be constituted by, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store a program (program code), a software module, and the like that can be executed to perform the determination process according to one embodiment of the invention.

The storage 1003 is a computer-readable recording medium and may be constituted by, for example, at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be referred to as an auxiliary storage device. The above storage mediums may be, for example, a database, a server, or another appropriate medium including the memory 1002 and/or the storage 1003. For example, the history storage unit 101, the residence storage unit 103, and the determination result storage unit 109 may be realized by the storage 1003.

The communication device 1004 is hardware (a transmission and reception device) that performs communication between computers via a wired and/or wireless network and is also referred to as, for example, a network device, a network controller, a network card, or a communication module.

The input device 1005 is an input device that receives an input from the outside, and the output device 1006 is an output device that performs an output to the outside. The input device 1005 and the output device 1006 may be implemented as a touch panel display in which both are integrated.

The devices such as the processor 1001 and the memory 1002 are connected to the bus 1007 for transmission of information. The bus 1007 may be constituted by a single bus or may be constituted by buses which are different depending on the devices.

The computer 20 may be configured to include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be implemented as at least one piece of hardware.

While an embodiment of the invention has been described above in detail, it will be apparent to those skilled in the art that the invention is not limited to the embodiment described in this specification. The invention can be altered and modified into various forms without departing from the gist and scope of the invention defined by description in the appended claims. Accordingly, the description in this specification is for exemplary explanation and does not have any restrictive meaning for the invention.

Figure 10:
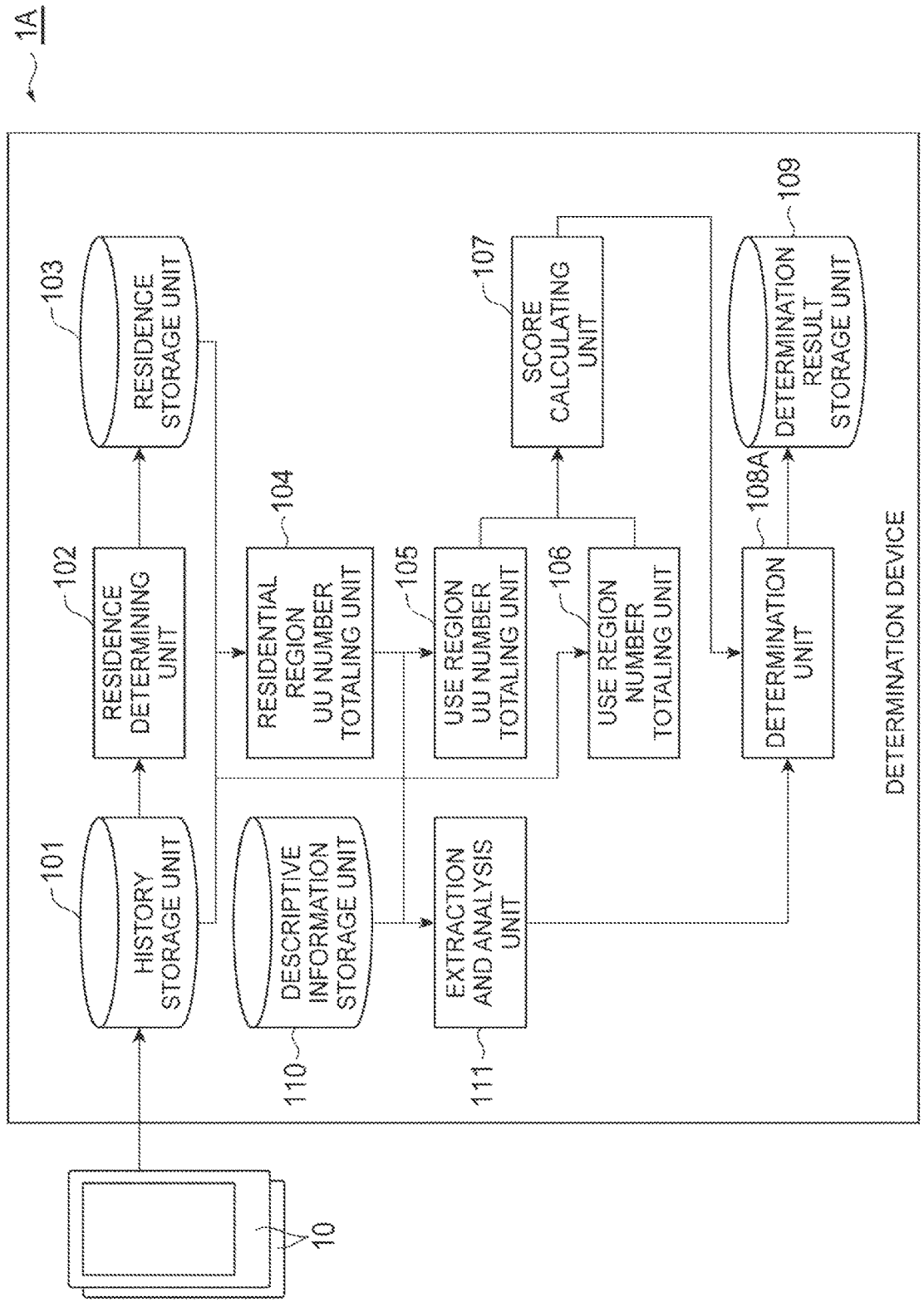
FIG. 10 is a block diagram illustrating a configuration of a determination device 1A according to a modified example.

For example, the determination device 1 according to the above embodiment may be modified to a configuration of a determination device 1A according to a modified example illustrated in FIG. 10. The configuration of the determination device 1A illustrated in FIG. 10 is different from that of the determination device 1 in that a descriptive information storage unit 110 and an extraction and analysis unit 111 are newly provided and the function of a determination unit 108A is different. In the following description, differences between the determination device 1A and the determination device 1 will be mainly described.

The descriptive information storage unit 110 stores, in advance, descriptive information for explaining details of each of a plurality of applications of which regionality is to be determined. The descriptive information is stored, in advance, by collecting the descriptive information from an external server device or the like via the communication network or the like. The descriptive information includes a package name and an application name for identifying an application, a category name indicating a category of the application, and introductory text which is a sentence for introducing the application.

The extraction and analysis unit 111 extracts and reads descriptive information such as corresponding introductory text from the descriptive information storage unit 110 for each of a plurality of applications. Then, the extraction and analysis unit 111 extracts words associated with place names from the descriptive information for each of the plurality of applications, totals the number of place names indicated by the words for each application, and converts the words to position information such as the longitude and latitude corresponding to the place names. Here, place names of the extracted words include station names, facility names, and the like in addition to prefecture names and municipality names, and may be stored, in advance, in correlation with position information in a database in the determination device 1A. The extraction and analysis unit 111 calculates a distance between a user position at the time of starting and a position identified from the descriptive information (hereinafter referred to as a start distance) on the basis of the converted position information for each of a plurality of applications and position information of users at the time of starting included in the use history information for each application and read from the history storage unit 101. The extraction and analysis unit 111 calculates the start distance for each application on the basis of a plurality of pieces of use history information in which the start time is included in a predetermined period, and calculates a statistical value of the calculated start distances for each application. An average value, a median value, a maximum value, a minimum value, or the like can be used as the statistical value. The extraction and analysis unit 111 outputs the calculated statistical value, the number of place names, and category information for each application to the determination unit 108A.

The determination unit 108A determines whether there is regionality for each application by performing machine learning using the regionality score SC for each application which is calculated by the score calculating unit 107 and the statistical value, the number of place names, and the category information for each application which are output from the extraction and analysis unit 111 as features. The determination unit 108A stores the result of determination for each application in the determination result storage unit 109. Examples of an algorithm for the machine learning which is used by the determination unit 108A include a support vector machine (SVM) and a random forest, but the machine learning is not limited to any specific algorithm.

Figure 11:
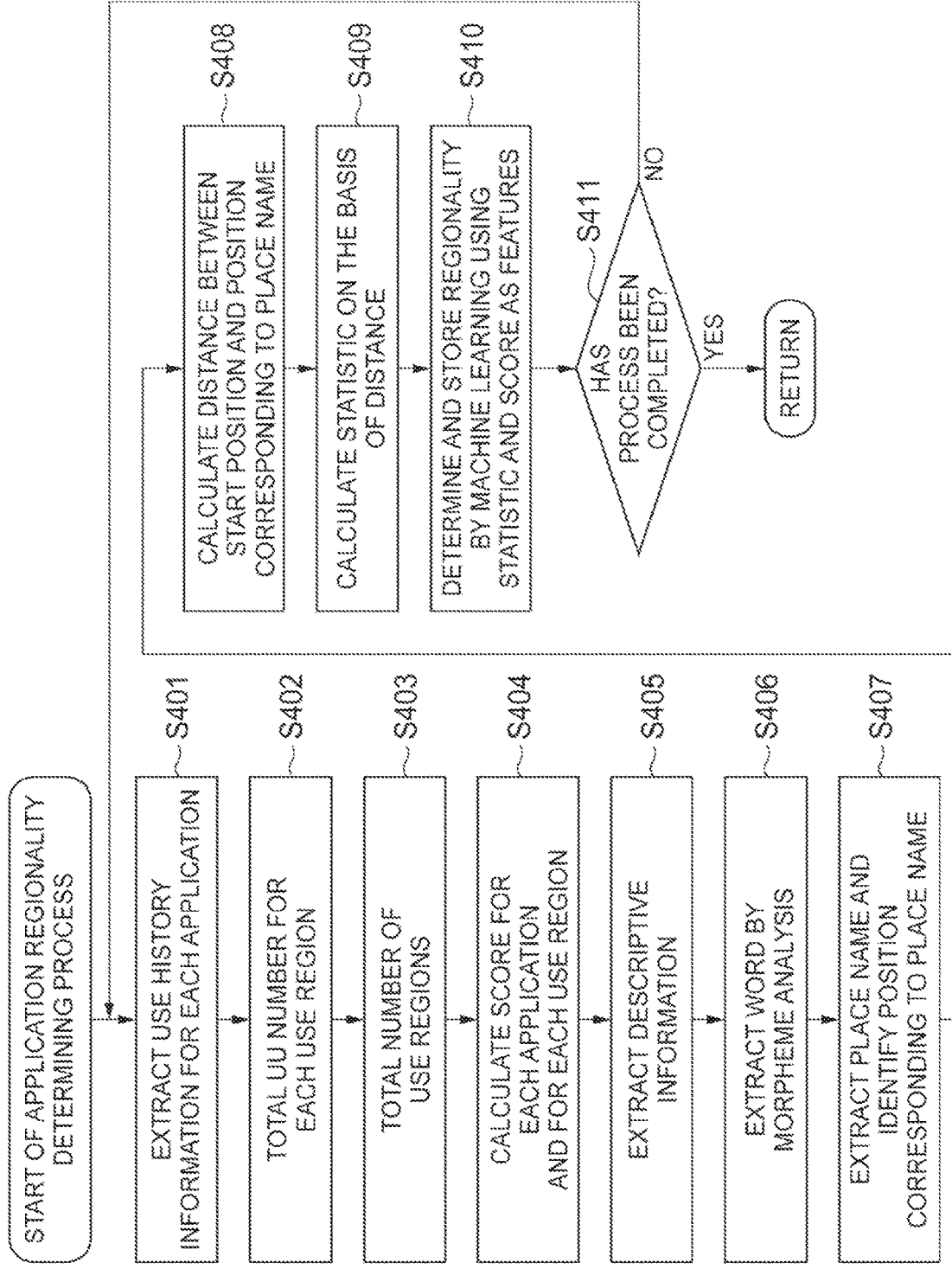
FIG. 11 is a flowchart illustrating a detailed operation flow of an application regionality determining process which is performed by the determination device 1A according to the modified example.

An operation flow of the application regionality determining process which is performed by the determination device 1A according to the modified example will be described below with reference to FIG. 11.

First, the regionality score SC for each use region for a specific application is calculated by the determination device 1A in the same order as the determination device 1 does (Steps S401 to S404). Then, the extraction and analysis unit 111 of the determination device 1A extracts and reads descriptive information corresponding to the specific application from the descriptive information storage unit 110 (Step S405). Then, the extraction and analysis unit 111 extracts words which are determined to be place names by analyzing morphemes of descriptive text included in the extracted descriptive information (Step S406). The extraction and analysis unit 111 extracts a place name with a maximum appearance frequency out of the extracted place names and identifies position information corresponding to the extracted place name (Step S407).

Thereafter, the extraction and analysis unit 111 calculates a distance (a start distance) between a position indicated by the position information identified from the descriptive information for the specific application and a position indicated by position information of each user included in the use history information corresponding to the specific application (Step S408). The extraction and analysis unit 111 calculates a statistical value on the basis of a plurality of start distances which are calculated for the use history information in which the start time is included in a predetermined period (Step S409). Thereafter, the determination unit 108 determines whether there is regionality for the specific application by performing machine learning using the regionality score SC corresponding to the specific application and the statistical value corresponding to the specific application, the number of place names described in an application name or descriptive text of descriptive information corresponding to the specific application, and the category information in the descriptive information as features. Then, the determination unit stores the determination result of regionality in the determination result storage unit 109 (Step S410).

The regionality determining processes (Steps S401 to S410) are repeatedly performed on all the applications until it is determined that the determination has been performed on all the applications by the determination device 1A (Step S411).

With the configuration of the determination device 1A according to the modified example, words associated with place names are extracted from descriptive information corresponding to a specific application, and whether there is regionality is determined on the basis of a regionality score and a numerical value calculated from words associated with place names at the time of determination of regionality. By performing determination in this way, it is possible to further enhance classification accuracy associated with regionality of an application.

In the determination device 1A, whether there is regionality is determined using machine learning with the regionality score and the numerical value calculated from words associated with place names as features. By performing the processes in this way, it is possible to further enhance classification accuracy associated with regionality of an application.

In the determination device 1A, a statistical value calculated on the basis of a distance between a position identified by a word and a position of a user at the time of use of an application is used as the numerical value calculated from the words associated with place names. In this case, it is possible to further enhance classification accuracy associated with regionality of an application.

Figure 12:
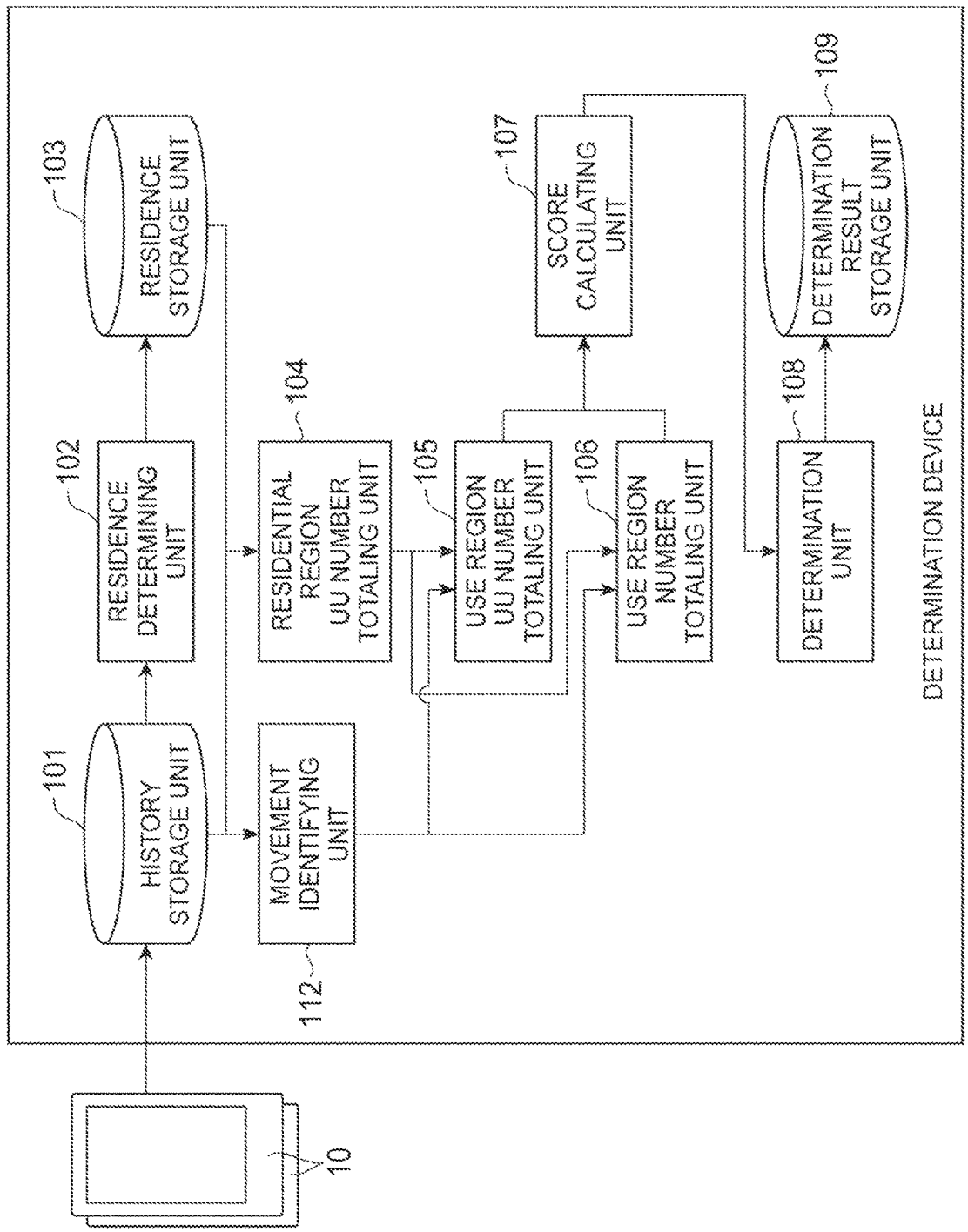
FIG. 12 is a block diagram illustrating a configuration of a determination device 1B according to another modified example.

The determination device 1 according to the above embodiment may be modified to a configuration of a determination device 1B according to a modified example illustrated in FIG. 12. The configuration of the determination device 1B illustrated in FIG. 12 is different from that of the determination device 1 in that a movement identifying unit 112 is further provided.

The movement identifying unit 112 identifies a movement state of a user at the time of use of an application by determining change in position information of the position of the user at the time of use of the application included in the use history information stored in the history storage unit 101. For example, the movement identifying unit 112 may detect a change in the position of the user over time before and after a start time indicated by the use history information, calculate a movement speed on the basis of the change over time, and identify a movement state of the user (for example, the magnitude of the movement speed) on the basis of the movement speed. The position information indicating the position of the user before and after the start time can be collected from a mobile communication terminal 10 or a facility in the communication network and stored in the history storage unit 101 in advance.

When the movement state of a user at the start time is a specific state (for example, when the movement speed is identified to be high), the movement identifying unit 112 controls the totaling processes in the use region UU number totaling unit 105 and the use region number totaling unit 106 such that the use history information associated with the corresponding user corresponding to the start time is excluded from the objects to be totaled. In this regard, the use region UU number totaling unit 105 and the use region number totaling unit 106 exclude the use history information excluded by the movement identifying unit 112 from the objects to be totaled.

With the configuration of the determination device 1B according to the modified example, the use history information is excluded from the objects to be totaled on the basis of a movement state of a user at the time of use of an application. By employing this configuration, it is possible to perform a process of excluding a use history associated with an application which has been used when a user is in a specific movement state (for example, in a state in which the movement speed is relatively high and the user is estimated to move by car, by subway, or the like) from objects of the regionality classifying process. As a result, it is possible to further enhance classification accuracy associated with regionality of an application.

In the above embodiment, the use region UU number totaling unit 105 calculates the UU number for each application and for each use region on the basis of the use history information stored in the history storage unit 101, but may calculate a use frequency (such as the number of start times) of an application for each application and for each use region. The use frequency indicates how often users located in each use region use each application and indicates a use tendency of an application in each use region. In this case, the score calculating unit 107 calculates the regionality score SC on the basis of the use frequency for each use region for a specific application.

The aspects/embodiments described in this specification may be applied to systems employing Long Term Evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which these systems are extended on the basis thereof.

The order of the processing sequences, the sequences, the flowcharts, and the like of the aspects/embodiments described above in this specification may be changed as long as it does not cause any inconsistencies. For example, in the methods described in this specification, various steps are described as elements in an exemplary order but the methods are not limited to the described specific order.

The input or output information or the like may be stored in a specific place (for example, a memory) or may be managed in a management table. The input or output information or the like may be overwritten, updated, or added. The output information or the like may be deleted. The input information or the like may be transmitted to another device.

Determination may be performed using a value (0 or 1) which is represented by one bit, may be performed using a Boolean value (true or false), or may be performed by comparison of numerical values (for example, comparison with a predetermined value).

The aspects or embodiments described in this specification may be used alone, may be used in combination, or may be switched during implementation thereof. Transmission of predetermined information (for example, transmission of "X") is not limited to explicit transmission, and may be performed by implicit transmission (for example, the predetermined information is not transmitted).

Regardless of whether it is called software, firmware, middleware, microcode, hardware description language, or another name, software can be broadly construed to mean commands, a command set, code, code segments, program code, a program, a sub program, a software module, an application, a software application, a software package, a routine, a subroutine, an object, an executable file, an execution thread, an order, a function, or the like.

Software, commands, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology are included in the definition of the transmission medium.

Information, signals, and the like described in this specification may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, an optical field or photons, or an arbitrary combination thereof.

The terms described in this specification and/or the terms required for understanding this specification may be substituted by terms having the same or similar meanings.

Names used for the parameters are not restrictive in any respect.

The term "determining" or "determination" which is used in this specification may include various types of operations. The term "determining" or "determination" may include cases in which calculating, computing, processing, deriving, investigating, looking up (for example, looking up in a table, a database, or another data structure), and ascertaining are considered to be "determined." The term "determining" or "determination" may include cases in which receiving (for example, receiving information), transmitting (for example, transmitting information), input, output, and accessing (for example, accessing data in a memory) are considered to be "determined." The term "determining" or "determination" may include cases in which resolving, selecting, choosing, establishing, comparing, and the like are considered to be "determined." That is, the term "determining" or "determination" can include cases in which a certain operation is considered to be "determined."

The expression "on the basis of" as used in this specification does not mean "on the basis of only" unless otherwise described. In other words, the expression "on the basis of" means both "on the basis of only" and "on the basis of at least."

When the term "include" or "including" and variations thereof are used in this specification or the appended claims, the terms are intended to have a comprehensive meaning similar to the term "comprising." The term "or" which is used in this specification or the appended claims is not intended to mean an exclusive OR.

In this specification, two or more of any devices may be included unless the context or technical constraints dictate that only one device is included.

In the entire present disclosure, singular terms include plural referents unless the context or technical constraints dictate that a unit is singular.

INDUSTRIAL APPLICABILITY

An aspect of the invention is applicable as a determination device that determines the type of application which is to be provided to a user and enables appropriate classification of an application in consideration of regionality in a use tendency of the application.

REFERENCE SIGNS LIST 1, 1A, 1B . . . Determination device, 10 . . . Mobile communication terminal, 101 . . . History storage unit, 103 . . . Residence storage unit (information storage unit), 104 . . . Residential region UU number totaling unit (third totaling unit), 105 . . . Use region UU number totaling unit (first totaling unit), 106 . . . Use region number totaling unit (second totaling unit), 107 . . . Score calculating unit, 108, 108A . . . Determination unit, 110 . . . Descriptive information storage unit, 111 . . . Extraction and analysis unit (extraction unit), 112 . . . Movement identifying unit

The invention claimed is:

1. A system for determining a type of application which is to be provided to a user, the system comprising:
at least one mobile communication terminal configured to record a time of starting an application used by a user and a time of ending the application in association with position information indicating a position of the user when the application is used; and
a determination device including
a storage device configured to accumulate and store use history information in which application identification information for identifying the application used by a user, position information indicating the position of the user when the application is used, and user identification information for identifying the user are correlated with each other whenever a plurality of applications are used by a plurality of users; and
a circuitry configured to
total a numerical value indicating a use tendency of a specific application in each of a plurality of regions using the use history information in which a position indicated by the position information is included in a region on a basis of the use history information for the specific application stored in the storage device, the use tendency being a value indicating a number of users who are located in the region and who use the specific application or indicating how often users located in the region use the specific application,
total a number of regions including the position indicated by the position information among the plurality of regions using the use history information for the specific application stored in the storage device,
calculate a score for each of the plurality of regions on the basis of the numerical value indicating the use tendency and the number of regions for the specific application,
determine, as a determination result, for the specific application on the basis of the score, an indication that an application has a higher level of use in a specific region in comparison to a number of other regions, when the calculated scores for a predetermined number or larger number of regions are equal to or greater than the predetermined value; and
actively transmit the determination result data, as recommendation information, to an external device via a mobile communication network,
wherein the circuitry is configured to receive the use history information repeatedly at arbitrary times through the mobile communication network from a plurality of mobile communication terminals each of which is respectively used by the plurality of users, and store the received use history information in the storage device,
wherein
the storage device stores descriptive information for describing details of each of the plurality of applications; and
the circuitry extracts a word associated with a place name from the descriptive information corresponding to the specific application stored in the storage device,
the circuitry determines the indication on the basis of the score and the word, and
the circuitry determines the indication by using machine learning with the score and a numerical value based on the word as a feature.

2. The system according to claim 1, wherein the circuitry totals a number of unique users identified by the user identification information as the numerical value indicating the use tendency.

3. The system according to claim 1, wherein
the storage device stores residence information indicating residences of the users,
the circuitry further totals a number of unique users identified by the user identification information using the use history information in which the residences indicated by the residence information of the users identified by the user identification information are included in each of a plurality of residential regions for each of a plurality of applications and each of the plurality of residential regions on the basis of the use history information and the residence information, and
the circuitry excludes the application from being an object to be recommended, from being an object to be totaled, for which at least one of the numbers of unique users in the plurality of residential regions is less than a threshold value.

4. The system according to claim 1, wherein
the circuitry
identifies a movement state of the user by determining a change in the position of the user indicated by the position information included in the use history information stored in the storage device, and excludes the use history information, from being an object to be totaled, that is associated with an application which has been used when a user is in a specific movement state.

5. The system according to claim 1, wherein the numerical value based on the word is a statistical value that is calculated on a basis of a distance between a position identified by the word and a position indicated by the position information included in the use history information for the specific application stored in the storage device.

* * * * *